United States Patent [19]

Harris

[11] Patent Number: 4,903,425
[45] Date of Patent: Feb. 27, 1990

[54] PIVOTAL ADAPTER FOR BIPODS AND ATTACHMENT THEREFOR

[76] Inventor: Gerald Harris, Rte. 1, Box 33, Barlow, Ky. 42024

[21] Appl. No.: 306,820

[22] Filed: Feb. 3, 1989

[51] Int. Cl.$^4$ ............................................. F41C 29/00
[52] U.S. Cl. ........................................................ 42/94
[58] Field of Search ................. 42/94; 89/37.03, 37.04

[56] References Cited

U.S. PATENT DOCUMENTS

| | | | |
|---|---|---|---|
| 861,939 | 7/1907 | Benet et al. | 89/33.01 |
| 965,158 | 7/1910 | Cowles | 248/291 |
| 1,029,951 | 6/1912 | Seely | 42/103 |
| 1,295,688 | 2/1919 | Butler | 42/94 |
| 1,372,599 | 3/1921 | Butler | 89/40.06 |
| 1,746,364 | 2/1930 | Schuler | 89/40.06 |
| 1,827,557 | 10/1931 | Bradford | 248/291 |
| 1,890,423 | 12/1932 | Teagarden | 42/94 |
| 2,375,721 | 5/1945 | Woodhull | 89/40.06 |
| 2,489,283 | 11/1949 | Garand | 42/94 |
| 2,845,737 | 8/1958 | Hoyer | 42/97 |
| 2,933,843 | 4/1960 | McFeeter | 42/85 |
| 3,327,422 | 6/1967 | Harris | 42/94 |
| 4,470,216 | 9/1984 | Harris | 42/94 |
| 4,625,620 | 12/1986 | Harris | 42/94 |
| 4,641,451 | 2/1987 | Harris | 42/94 |

FOREIGN PATENT DOCUMENTS 763020 4/1934 France ............................ 248/291
286537 10/1953 Switzerland ..................... 42/103

Primary Examiner—Charles T. Jordan
Attorney, Agent, or Firm—Harness, Dickey & Pierce

[57] ABSTRACT

A pivotal adapter includes a mounting bracket adapter for attachment to a bipod bracket pivotally attached to a base adapted for attachment to a firearm. A spring assembly is included to provide biased engagement between the mounting bracket and the base. The spring assembly biases against pivotal movement between the mounting bracket and the base for inhibiting unintended pivoting and rattling of the mounting bracket.

A mounting assembly for removable attachment of a bipod to a firearm includes a base for cradling of the forestock of a firearm. A strap releasably attaches the base to a firearm by encircling of the firearm. A clamping assembly allows the strap to clampingly engage the firearm.

A bipod adapter for attaching a bipod to a semi-automatic firearm includes an adapter base which is associated with the firearm in a generally perpendicular manner. A portion of the adapter base engages the barrel for inhibiting rotational movement of the bipod adapter. A fastener fastens the adapter base against the fore-end block of the firearm. A bipod may be attached to a flange portion of the bipod adapter.

17 Claims, 8 Drawing Sheets

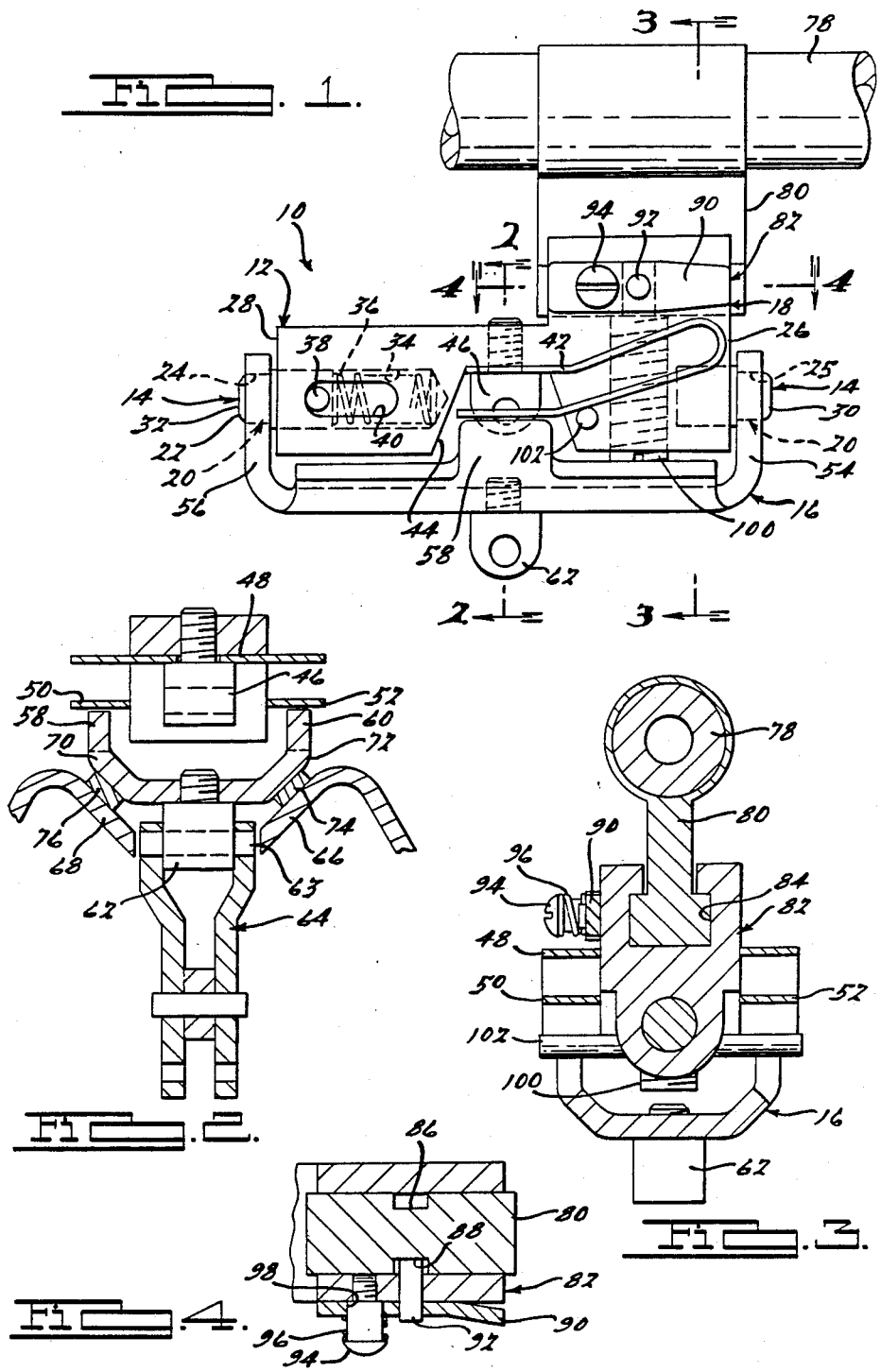

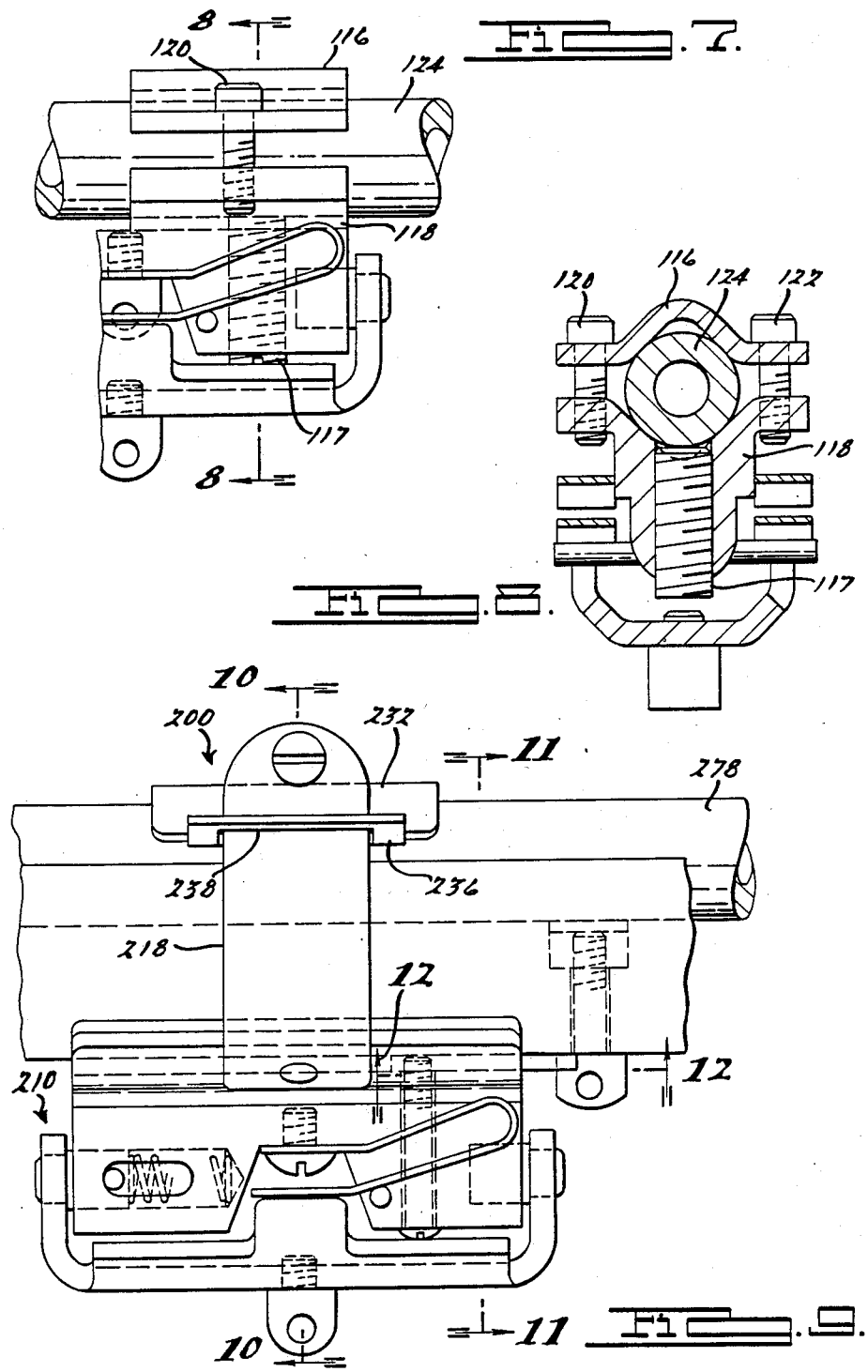

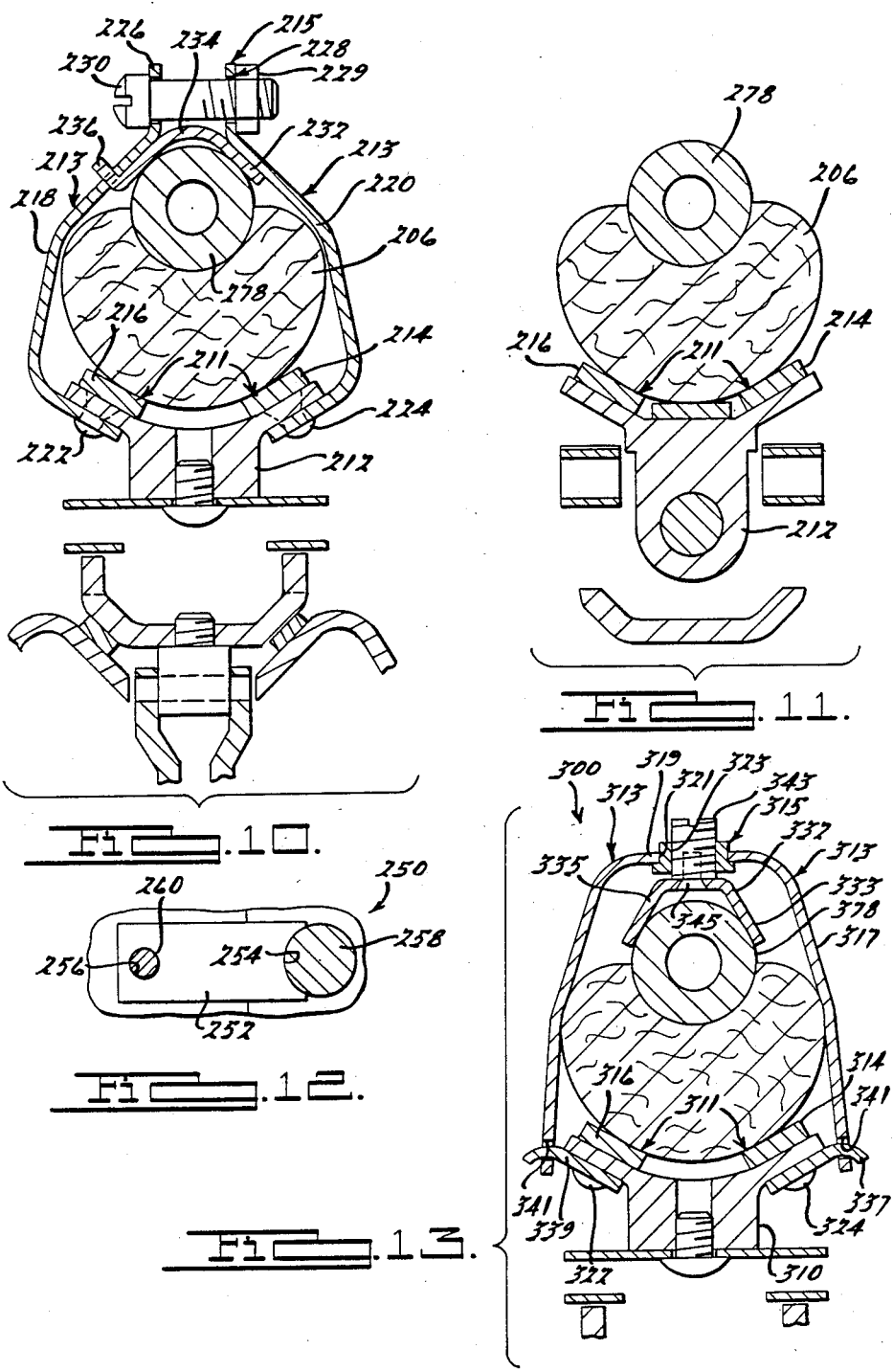

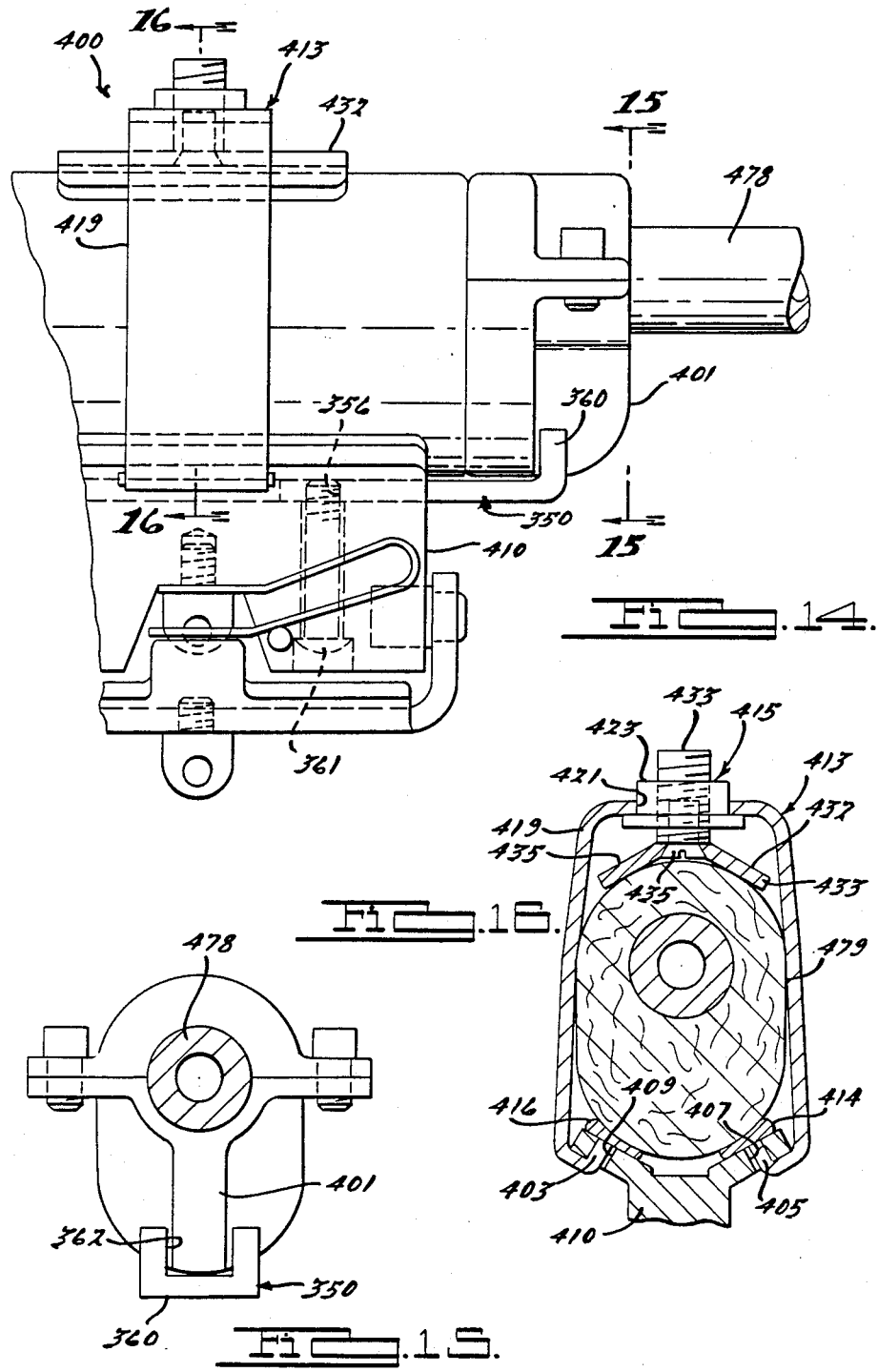

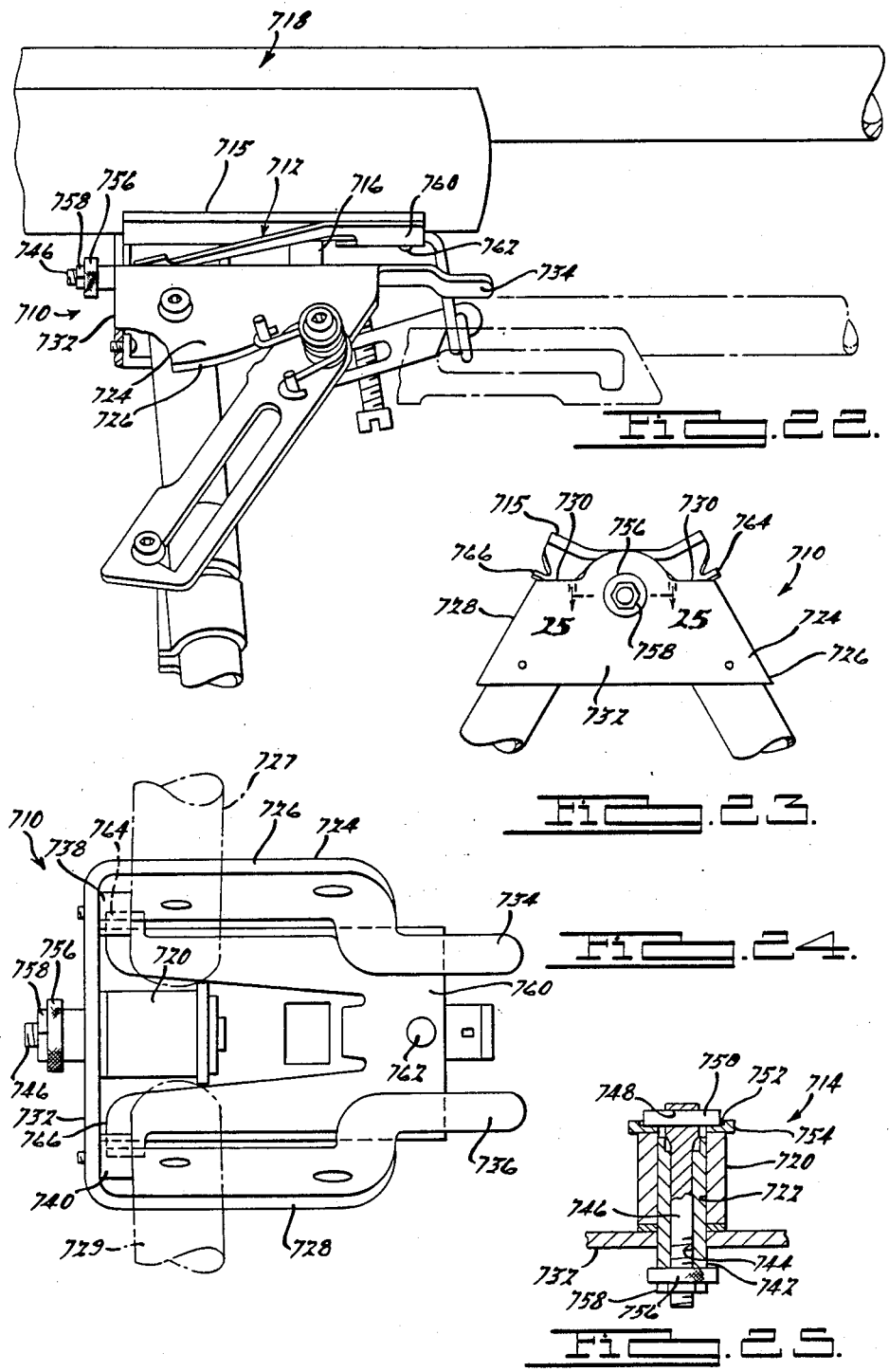

PIVOTAL ADAPTER FOR BIPODS AND ATTACHMENT THEREFOR

BACKGROUND AND SUMMARY OF THE INVENTION

The present invention relates to bipods and mounting devices therefor. More particularly the present invention relates to pivotal bipod assemblies and novel mounting assemblies for attaching a bipod to a firearm such as a rifle or the like.

Modern firearms, such as rifles in particular, may be more accurately and conveniently fired by the user if the firearm is equipped with a bipod device for supporting and steadying the barrel. Bipods may be fixedly or removably mounted onto firearms and have been found to be most convenient if they can be somehow retracted in a storage position when they are not in use. Lightweight bipods and mounts therefor are taught in my prior U.S. Pat. Nos.: 3,327,422 issued June 27, 1967; 4,470,216 issued Sept. 11, 1984; 4,625,620 issued Dec. 2, 1986; and 4,641,451 issued Feb. 10, 1987; the disclosures of which are incorporated herein by reference thereto. While the bipods disclosed in these prior patents are extremely convenient, may be adjusted and retracted and include various advantageous mounting assemblies, there remain certain desirable improvements which have not been heretofore recognized but are addressed in the present invention. For instance, while these prior bipod devices are adjustable for various forward and reverse angles with respect to the barrels and are also adjustable with respect to the bipod leg length which may be retracted or extended to adjust to various shooting situations, the bipods require time consuming adjustment which time is not always available in hunting and other shooting situations. Also, these bipods do not readily adapt themselves to slanted surfaces and irregular surfaces when in use. This increases the frustration level of the user and/or chances of missing a shot due to the excess time required for finding a suitable rest for the firearm bipod during shooting and for adjusting the bipod to accommodate various irregular surfaces.

A bipod which is pivotal in a plane generally transverse to the barrel of a firearm is shown in U.S. Pat. No. 2,489,283.

Additionally, while these types of bipods may be retracted for storage and carrying they have had a tendency in the past to rattle about and create other unwanted noises when in use or while in the retracted position.

A further disadvantage is that while many of these bipods are designed for attachment at a sling swivel stud or other places adaptable for mounting of bipods found on many firearms, there is an increased need for a universal adapter which may be attached or removed from a variety of firearms as desired by the firearm owner and without undue wear and tear on the firearm.

Additionally, it has been a goal in the art to provide a quick release mechanism whereby the bipod extension may be easily removed leaving a bipod mounting attachment on the rifle. Also, in the past there has been a need to provide a mechanism for releasable attachment on a semi-automatic rifle.

In the present invention a pivotal bipod adapter is provided which allows the legs of the bipod to pivot in a single plane which is generally perpendicular to the gun barrel direction. This allows the shooter to place the bipod and gun on an uneven surface quickly and without unnecessary canting of the rifle. In the pivotal bipod assembly of the present invention the pivotal adapter is configured such that undesirable rattling type noises from the bipod adapter are diminished substantially. Additionally, in accordance with the present invention there is provided a universal bipod mount assembly which may be advantageously attached to a rifle without any necessary modification or addition of sling swivels or other nonremovable type fixtures to a firearm. The adapter of the present invention also includes a quick release feature whereby the bipod and moving parts thereto may be easily detached from a firearm. A novel apparatus for attaching a bipod to a semi-automatic rifle is also provided.

According to the present invention there is provided a pivotal adapter assembly for pivotally attaching a bipod to a firearm. The pivotal adapter assembly includes a base portion which has a means for providing a pivotal engagement with a mounting bracket of a bipod. A means for attaching the base portion to the firearm is also included. The mounting bracket for attachment to the bipod base includes portions thereof for cooperating with the base portion, which portions provide for pivoting of the mounting bracket in a single plane or direction generally transverse to the direction of the barrel.

Also, provided in the present invention is an apparatus for removably attaching a bipod to a firearm. The apparatus has a base with a facing means for contoured cradling of the forestock of a firearm. A strap member is provided for allowing releasable attachment of the base to the firearm. The strap is connected to the base and encircles portions of the firearm. The strap includes a means thereon for clampingly engaging the firearm between the strap and the facing means. The apparatus also includes a means for attachment of a bipod assembly to the base portion.

A bipod adapter for a semi-automatic firearm is also provided. A bipod adapter is provided for use on a semi-automatic firearm which firearm includes a gas block having a threaded bore therein and a fore-end cap adapted for being fastened to the gas block with a fastener. The bipod adapter of the present invention includes a adapter base with a bore therethrough. The base is associated with the firearm generally perpendicular to the longitudinal axis of the barrel when in assembled relationship with the firearm. Portions of the adapter base are provided for substantially engaging portions of the barrel for inhibiting rotational movement of the bipod adapter. A fastener is included for providing axial forces against the base for fastening of said fore-end block and said base to said gas block. A portion of the bipod adapter is provided for the attachment of a suitable bipod.

BRIEF DESCRIPTION OF THE DRAWINGS

FIG. 1 is a planar view of the pivotal adapter assembly of the present invention partially in phantom;

FIG. 2 is sectional view taken along line 2—2 of FIG. 1;

FIG. 3 is a sectional view taken along line 3—3 of FIG. 1;

FIG. 4 is a sectional view partially broken away taken along line 4—4 of FIG. 1;

FIG. 7 is a planar view partially broken away showing an alternate mounting configuration of the pivotal adapter of the present invention;

FIG. 8 is a sectional view taken along line 8—8 of FIG. 7;

FIG. 9 is a planar view partially in phantom of the mounting assembly for removably attaching a bipod to the firearm of the present invention;

FIG. 10 is a sectional view taken along line 10—10 of FIG. 9;

FIG. 11 is a sectional view taken along line 11—11 of FIG. 9;

FIG. 12 is a sectional view taken along line 12—12 of FIG. 9;

FIG. 13 is a sectional view of an alternate embodiment of the mounting assembly of the present invention;

FIG. 14 is a planar view partially broken away and partially in phantom of an alternate embodiment of the mounting assembly;

FIG. 15 is a sectional view taken along line 15—15 of FIG. 14;

FIG. 16 is a sectional view taken along line 16—16 of FIG. 14;

FIG. 22 is a side view partially in phantom and partially broken away of a pivotal bipod assembly mounted on a firearm including a tensioning assembly for adjustment of pivotal resistance;

FIG. 23 is a rear view partially broken away of the assembly shown in FIG. 22;

FIG. 24 is a detailed bottom view partially in phantom of the assembly of FIG. 22; and FIG. 25 is a detailed cross-sectional view of the tensioning adjustment assembly taken along line 25—25 of FIG. 23.

DETAILED DESCRIPTION OF THE PREFERRED EMBODIMENTS

Figure 5:
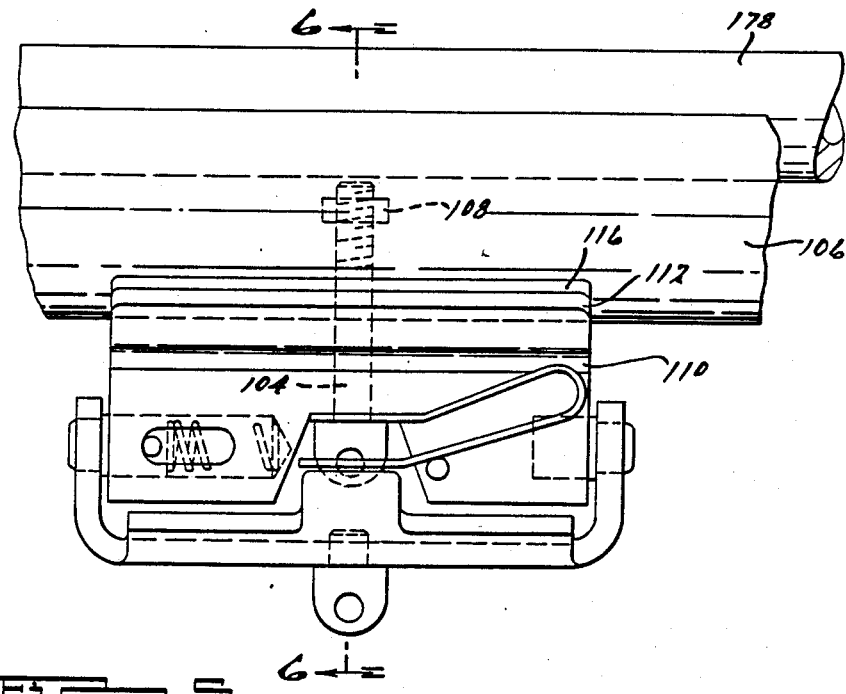
FIG. 5 is a planar view partially in phantom showing an alternate means for connecting the pivotal adapter to a firearm.
Figure 6:
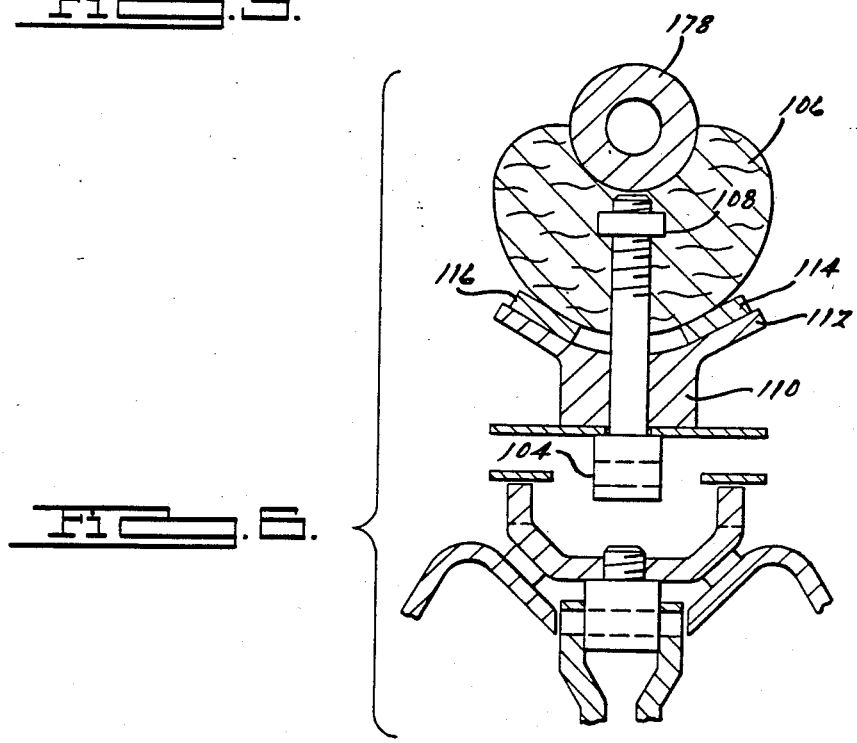
FIG. 6 is a sectional view taken along line 6—6 of FIG. 5.

For purposes of illustration, various embodiments of the present invention are shown in the drawings as attached or mounted to a rifle. One skilled in the art will readily recognize, however, that various embodiments of the present invention are applicable to other types of firearms as well.

FIG. 1 generally illustrates a pivotal adapter assembly 10 for pivotally attaching a bipod to a firearm. Pivotal adapter 10 includes a base portion 12 which has a means 14 for providing pivotal engagement with a mounting bracket 16. A means 18 for attaching the pivotal adapter to a firearm is also provided. The mounting bracket 16 is pivotal in a single plane about the base portion 12 through cooperating portions 20 of the bracket 16.

The base portion 12 includes a forward portion 26 and a rear portion 28. Pivot pins 30 and 32 are provided at portions 26 and 28 of the base portion 12. Pivot pin 32 is slideably positioned in bore 34. Bore 34 is longer than the pin 32 such that a spring 36 is disposed in the bore and thereby facilitating extension and retraction of pin 32. A stopping protrusion 38 is provided which extends into slot 40 in the base portion 12. Thus, the pin 32 may be depressed into the bore 34 and thereafter extends outward until pin 38 is stopped in slot 40 from further outward movement.

Pin 30 is press fit in base portion 12 or otherwise secured thereto. The base also includes a spring member 42 operably attached in indentation 44 in the base 12 by way of a fastener 46. Spring member 42 includes a base portion 48 and spaced spring tongues 50 and 52 which are generally folded back over the base portion 48 as shown in FIG. 1.

Mounting bracket 16 includes upwardly disposed front 54 and rear 56 flanges thereon. These flanges include bores 24 and 25 therein for engagement with pins 32 and 30 respectively. Bracket 16 also includes upwardly disposed side portions 58 and 60 which are operatively positioned to engage spring tongue portions 50 and 52 respectively. A sling swivel mounting screw 62 (also referred to herein as a quick detachable stud) is provided in the base of mounting bracket 16 for securement of a bipod 64 thereto as shown in my prior patents. Bipod 64 includes upwardly directed portions 66 and 68 which engage angled portions 70 and 72 through pads 74 and 76. A roll pin 102 is provided as a stop to prestress the tongue members 50, 52 of spring 26 and also to provide for only limited outward movement of the spring tongues 50 and 52.

The embodiment shown in FIG. 1 is shown with means for attachment to a bayonet stud mount found in many military type firearms. Thus, referring to FIG. 1 a rifle barrel 78 which includes a bayonet stud mount 80 attached thereto is engaged by an attachment portion 82 of the base 12. The attachment portion 82 is shown in more detail in FIGS. 3 and 4. The attachment portion 82 includes a channel 84 therein for sliding onto the "T" shaped bayonet stud mount 80. Bayonet stud mount 80 includes a pair of grooves 86 and 88 running vertically along either side thereof. A locking catch 90 is provided on the attachment portion 82 which includes a locking engagement pin 92 for engaging a slot 88 of the bayonet stud mount 80. The locking catch 90 is spring mounted by way of a shoulder screw fastener 94 fastened into the attachment portion 82 with helical spring 96 disposed between the catch 90 and the head of screw 94. A bore 98 is provided in catch 90 whereby the catch 90 may be advanced along the length of the shoulder screw 94 for removing pin 92 from engagement with groove 88. A set screw 100 is also provided in the base portion for providing secure, relatively recoil resistant attachment to the bayonet stud mount.

In operation, the assembly 10 is mounted on the bayonet stud 80 by first retracting the pin 92 to be even with the inner surfaces of the mounting portion 82 by way of actuating the catch release 90 away from portion 82. The portion 82 is then axially moved along portion 80 until the pin 92 engages slot 88. Thereafter set screw 100 is shored down to ensure a tight fit between the base and the bayonet stud mount 80, set screw 100 also acts as a recoil stop and helps to prevent loosening or damage of the mount due to recoil forces during firing of the firearm. Thereafter, a bipod may be attached to fastener 62 by way of pin 63 such as shown in my prior patents.

The bracket 16 is pivotal about pins 30 and 32 in a single plane which is preferably a direction transverse to the axial direction of the barrel. This provides limited movement such that if the shooter is on a tilted or uneven surface the bipod legs can be easily situated by pivoting of the bracket as needed to sturdily engage the tilted surface. Tongue portions 50 and 52 of the spring 26 operatively engage the portions 58 and 60 of the base such that tilting is accomplished without teetering, collapse or other mishaps. Springs 50 and 52 also provide for a relatively rattle-free construction when transporting or moving the firearm thus reducing unwanted noise generally associated with bipods. While a pre-stressed flat spring is shown in the drawings it is within the scope of the present invention that other types of springs and stop arrangements could be used without deviating from the scope of the present invention.

The assembly of the present invention allows easy removability of the bipod and mounting bracket 16 by way of simply depressing or retracting the pin 32 and easily removing the bracket over the end of pin 30. Thus, the base portion 12 may be allowed to remain on the firearm without the necessity of having a bipod attached thereto.

FIGS. 5 through 8 disclose alternate embodiments for connection of the pivotal adapter assembly of the present invention to conventional firearms. For instance, in FIG. 5 there is shown an attachment to a firearm by way of the sling swivel stud 104. Sling swivel studs 104 are conventionally mounted in a forearm stock 106 of a firearm by way of a nut 108 embedded or otherwise operatively associated with a bore in the stock. These are conventionally used for attaching a rifle sling or the like to a firearm. The present invention has been modified for use in attaching the pivotal adapter assembly by use of the stud 104 and a stock engaging portion of the base 110. The engaging portion includes a cradling portion 112 for cradling of a firearm stock. Cradling portion 112 may include pad portions 114 and 116 to prevent marring or other possible damage to the stock 106 of the firearm. Thus, in operation the stud 104 is passed through spring portion of base 110 and operatively fastened into nut 108. This holds the adapter assembly securely on the firearm.

In FIG. 7 an alternate assembly is shown for barrel mounting of the pivotal bipod adapter assembly of the present invention. As shown therein an upper barrel engaging bracket 116 along with a lower barrel engaging bracket 118 are provided for clampingly engaging the barrel of a firearm. Fasteners 120 and 122 are provided for clamping the barrel 124 of a rifle 124 therebetween. Set screw 117 in this embodiment is provided to ensure a secure recoil-resistant grip on the barrel 124.

The present invention also includes a mounting apparatus generally shown at 200 through which the bipod adapter 210 may be advantageously adapted to a variety of firearms. This mounting apparatus provides a non-permanent and readily removable mounting for the bipod adapter or bipod on a firearm. The base portion of bipod adapter 210 includes a forestock cradling portion which has pads for cradling the forearm without damage to the forestock. The mounting apparatus 200 includes a base 212 having facing means 211 for contoured cradling of the forestock of the firearm. A strap means 213 is provided for providing releasable attachment of the base 212 to a firearm. The strap means 213 is connected to the base portion for encircling of the firearm. A means 215 is provided on the strap means 213 for reducing the area encompassed by the strap means 213 thereby allowing for clamping engagement of the firearm between the strap means and the facing means.

Referring to FIG. 10 the strap means 213 includes a pair of outer strap members 218 and 220 which are connected to the base 210 by fasteners 222 and 224. As shown in the drawings the strap members 218 and 220 are operatively curved to provide for the contours of the forestock. These straps include upwardly directed flanges 226 and 228 respectively which have bores therein allowing a fastener 230 to be inserted therethrough. An inner barrel engaging saddle strap member 232 is provided for engaging the barrel of the firearm. Saddle strap 232 includes an arcuate portion 234 and a flange portion 23. As can be seen more clearly in FIG. 9 the flange portion 236 includes an opening 238 therein which allows the strap member 218 to be passed therethrough.

In operation, the straps 218, 220 are placed on either side of the firearm axially over the barrel without the inclusion of saddle strap 232 or fastener 230. After positioning in the proper location the saddle strap 236 is positioned as shown in FIG. 10 the fastener is passed through the bores in flanges 226 and 228. Thereafter fastener 230 clampingly engages the forestock between pads 214 and 216 and the saddle strap 232 by tightening of the nut 229 which pulls flanges 226 and 228 together.

Referring to FIG. 12 a recoil stop 250 may be advantageously provided in the mounting apparatus of the present invention. Recoil stop 250 includes the member 252 which has an arcuate surface 254 at an end thereof. A threaded bore 256 is provided in member 252 for securing the recoil stop to the face of the bipod adapter base 212. In operation the mounting assembly is positioned near the swivel stud 258 of a firearm such that arcuate portion 254 directly abuts swivel stud 258. The mounting assembly is then attached and clamped into position and the screw 260 is thereafter tightened to secure the recoil stop to the assembly.

In operation, recoil stop 250 assists in the prevention of problems associated with rifle recoil such as changing the position or otherwise altering the position of the removable mounting assembly.

In an alternate embodiment as shown in FIG. 13 the strapping means 313 is a singular outer strap member 317 with an upper flat surface 319 having a bore 321 which has a nut like member attached therein. The inner saddle strap member 332 is generally "U" shaped having barrel engaging portions 333 and 335. In this embodiment claw portions 337 and 339 are attached to the base 310 by way of fasteners 324 and 322. Claw portions 337 and 339 have curved end portions which engage openings 341 on the strap portion.

In operation, the mounting member may be again slid axially over the barrel or the base portion may be positioned and the strap having the saddle positioned therein may be placed over the barrel with the lower portions thereof spread apart and thereafter placed into position on claws 339 as shown in FIG. 13. When in position the saddle 332 is generally retained onto screw 343 by way of fastener 345. However, the bore in the saddle is wide enough such that turning of screw 343 will merely bear against the saddle portion 332 for clampingly engaging the barrel but will not create rotational forces in strap 332.

The embodiment shown in FIGS. 14–16 is similar to that shown in FIG. 13, however, in this case the installation is shown on a military type rifle which includes a barrel 478 surrounded by a stock 479 and a front portion 401 such as commonly found in many military type rifles.

Referring now to FIGS. 14 through 16 the embodiment of this invention is generally the same as that shown in FIG. 13. The mounting assembly 400 includes an outer strap 419 which is a singular strap. The inner saddle strap member 432 includes stock engagement portions 433 and 435 which are slightly more angular in an outward direction than those for engaging a barrel since a stock will generally be wider than merely the barrel. Additionally, a distinction between this and the embodiment shown in FIG. 13 is that pad portions 414 and 416 are directly a part of strap 419. Strap 419 includes portions 403 and 405 which engage the base 410 through openings 407 and 409 therein.

The recoil stop 350 in this embodiment includes a member having an upturned flange 360 which includes a "U" shaped opening 362 therein for engaging the portion 401 of the rifle. The recoil stop is again held into place through fastener 361 engaging a bore 356 in recoil stop 350.

Figure 17:
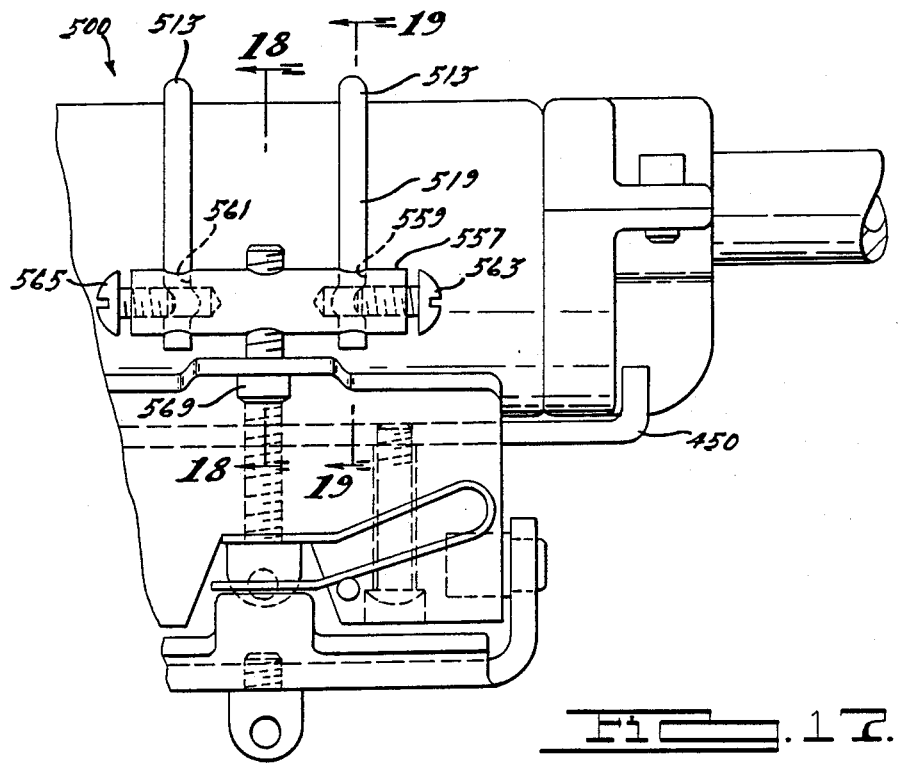
FIG. 17 is a planar view partially broken away and partially in phantom of still further embodiment of the mounting assembly of the present invention.
Figures 18, 19:
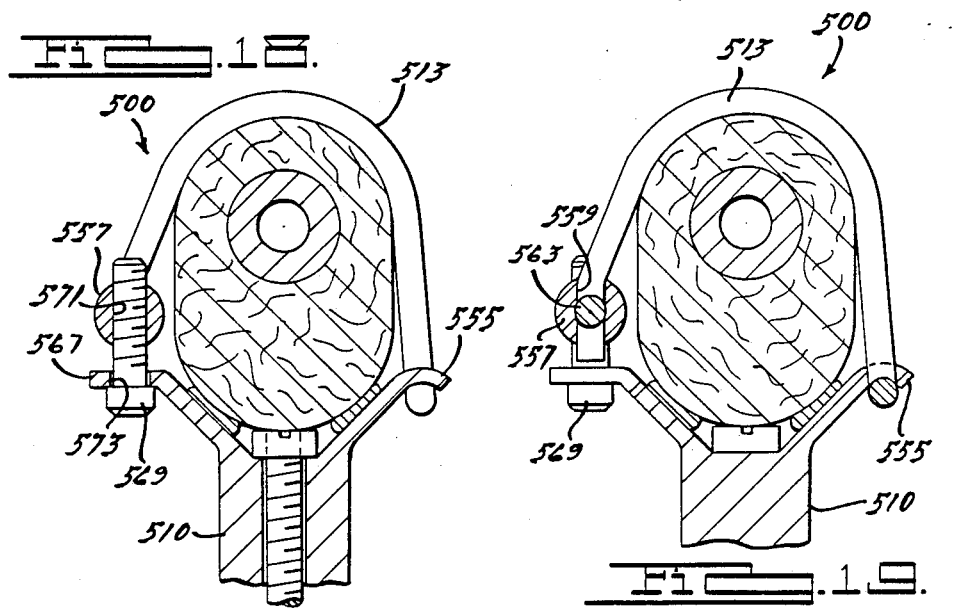
FIG. 18 is a sectional view taken along line 18—18 of FIG 17.
FIG. 19 is a sectional view taken along line 19—19 of FIG. 17.

Referring now to FIGS. 17 through 19 there is a further alternate embodiment of the present invention. In this embodiment the strap means 513 includes a nylon cord or the like 519 which encircles the barrel or stock of the rifle. As shown in the figures cord 519 is wrapped around a suitable flange 555 of the base 510 and thereafter secured in cord retainer 557. Cord retainer 557 is generally a cylindrical member with threaded bores on its axial ends. Through-bores 559 and 561 are provided in the member 557 for passing the ends of cord 519 therethrough. Through bores 559 and 561 are in alignment with and overlapping the threaded bores in the axial ends of cord retainer 557. The fasteners 563 and 565 are provided for securing the cord in member 557 by combining the cord therein since the bores in the axial ends are lined with bores 561 and 569.

On the opposite flange 567, base 510 includes a bore 573 through which fastener 569 may be inserted.

Member 557 includes a threaded bore 571 therethrough which may be operatively aligned with fastener 569 when the cord is in position on the firearm. In operation, the cord is situated and secure into the member 557 and this is slipped over into engagement with the rifle stock. Thereafter fastener 569 engages the bore 571 of member 557 and may be tightened down in order to reduce the area encompassed by the cord and stock engaging portion to thereby clampingly engage the rifle. As in the other embodiments a recoil stop 450 such as that shown in the other embodiments may also be provided.

While nylon cord or the like may be advantageously used in the present invention various other flexible strapping materials may be used in light of these teachings. For example, the use of wire, cable, cloth straps or other flexible materials could advantageously be used in the present invention without deviating from the scope of the present invention.

Figure 20:
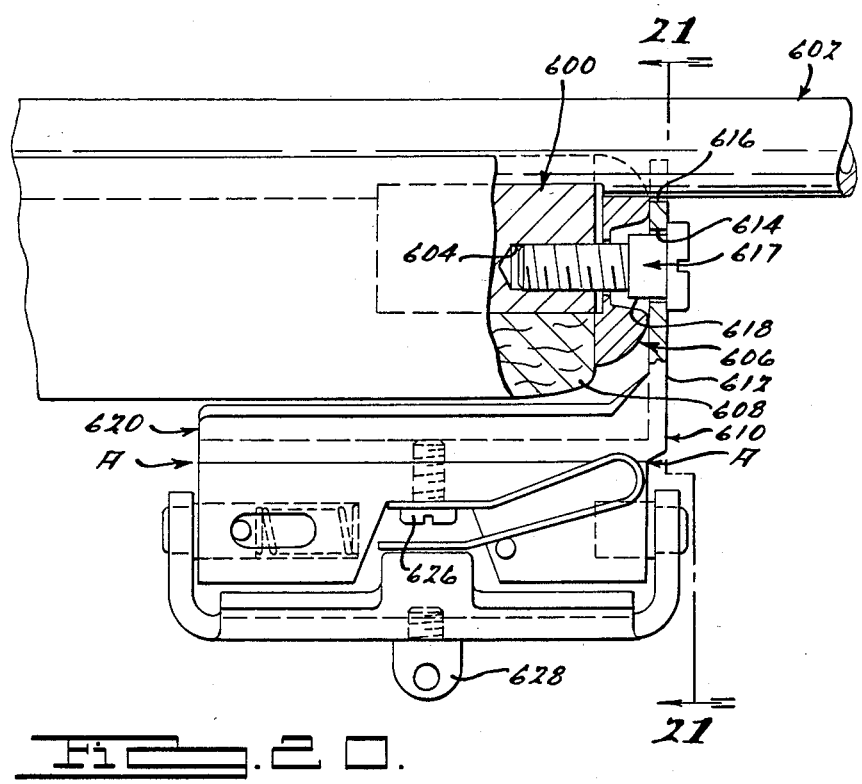
FIG. 20 is a planar view partially broken away of a bipod adapter for attachment of a bipod to a semiautomatic rifle.
Figure 21:
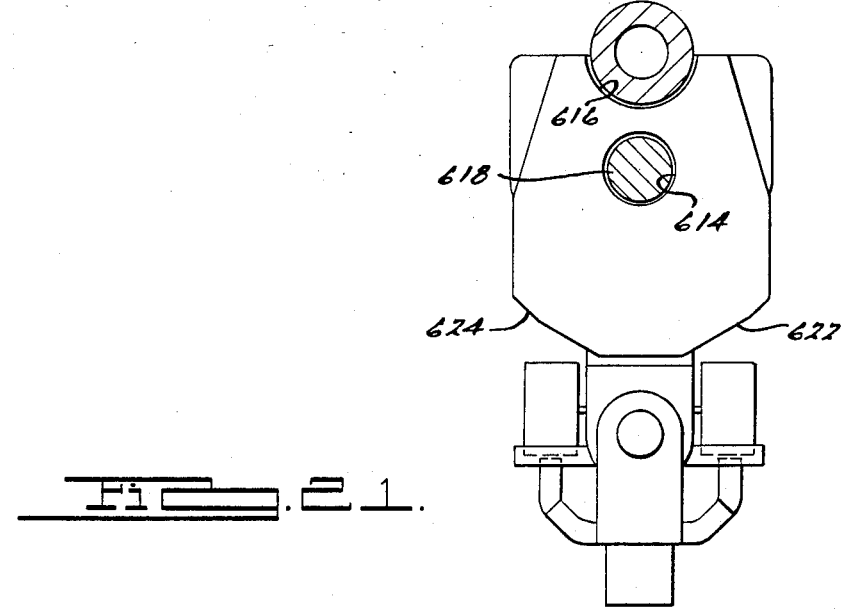
FIG. 21 is sectional view taken along line 21—21 of FIG. 20.

Referring now to FIGS. 20 and 21 there is provided a bipod adapter for use on a semi-automatic rifle. Semi-automatic rifles produced today by companies such as Ruger, Garand, BAR and Heckler & Koch and others, generally include a gas block 600 attached to a barrel 602. Gas block 600 serves two purposes on a firearm. Gas blocks such as gas block 600 primarily provide the means for discharged gas produced from the firing of a live round through the firearm to actuate the mechanism to eject spent shells from the chamber of the firearm. A second purpose is that the gas block has a threaded bore 604 which may be engaged by a fastener such that the fore-end cap 606 secures the forestock 608 of the firearm to the firearm.

In the present invention there is provided a bipod adapter 610. Bipod adapter 610 includes an adapter base 612. The adapter base 612 includes a portion 614 defining a bore therethrough. When assembled on the firearm, the base 612 is generally perpendicular to the longitudinal axis of the barrel 602.

Arcuate cut-out portion 616 of the adapter base 612 is for substantially engaging portions of the barrel 602 for inhibiting rotational movement of the bipod adapter 610.

Shoulder screw 617 is provided for presenting axial compression forces against the adapter base 612 and fore-end cap 606 for securing fore-end cap 606 and forestock 608 in position on the firearm. Shoulder screw 617 includes a shoulder portion 618 which engages the portion 614 forming the bore in adapter base 612.

Bipod adapter 610 includes an attachment flange portion 620. Attachment flange portion 620 includes a pair of upwardly turned side edge portions 622 and 624 which provide reinforcement for the attachment flange portion 620. As shown in FIG. 20 the bipod adapter 610 ma provide a means for attachment of a pivotal bipod adapter as described above to a semi-automatic firearm. In the alternative, this novel bipod adapter would be useful in mounting other types of bipods to semi-automatic firearms. For instance, the flange portion 620 could be modified to provide for attachment of a standard bipod such as those of my prior designs which are attachable to a quick detachable stud with a bore therethrough (such as quick detachable stud 628). This modification may be accomplished by forming the flange portion 620 out of flat sheet metal. In this alternate embodiment the portion below the plane A—A would be absent and a quick detachable stud would be attached in the place of screw 626.

The bipod adapter for a semi-automatic firearm provides for quick and easy attachment or removal of a bipod from a semi-automatic firearm without the necessary addition of a permanent mount thereto.

Referring now to FIGS. 22 through 25, also provided for in the present invention is a pivotal assembly 710 for a bipod for a firearm which includes a spring assembly 712 for providing resistance against off center rotation of the gun on the bipod and includes a means 714 for adjusting the tension about the pivotal point for providing variable resistance against pivoting.

This pivotal bipod provides for all of the advantages previously set forth with respect to the pivotal bipod adapter. Additionally, the pivoting can be tensioned to reduce rattling which might otherwise be present due to play in the pivotal assembly 710. Tensioning of the pivotal assembly also results in advantages in that depending on the weight of the firearm more or less tensioning can be used to prevent the tendency of teetering.

The pivotal assembly for a bipod 710 is shown as used on a "strut" type foldable bipod assembly such as that disclosed in my U.S. Pat. No. 4,625,620. However, the pivotal bipod mount would also be useful with other bipods whether retractable or fixed. As an example, the pivotal assembly is equally suitable for use with a retractable bipod having over-center springs such as that shown in my U.S. Pat. No. 3,327,422.

The pivotal assembly 710 includes a base portion 715 which is attachable to a quick detachable stud 716 of the firearm 718. Base portion 715 includes a cylinder 720 attached at a rearward portion. Cylinder 720 includes an axial bore 722 therethrough which is generally parallel in its alignment with the barrel of the firearm 718.

A leg support base 724 is provided. Leg support base 724 includes downwardly extending side portions 726 and 728 which are inclined relative to a plane encompassing upper surfaces 730. Rearward portion 732 generally extends perpendicularly from the planar surface 730 for connecting the side portions 726 and 728 and also extends in a plane which is generally perpendicular to the barrel axis.

A pair of bipod legs (727, 729) are rotatably attached to the side portions 726 and 728. Forward leg stops 734 and 736 are provided as stops against which the bipod legs abut in the retracted position (shown in phantom in FIG. 22). Rearward leg stops 738 and 740 are provided for removing play in the legs when in the extended position, thus contributing to a reduction in potential rattling in the assembly. Preferably, the rearward leg stops are made of a resilient material such as rubber, nylon or elastomer material which allows these leg stops to act as shock absorbers when actuating the bipod legs into the extended position.

Referring now to FIG. 25, the means for adjustable tensioning of the pivotal assembly 714 is shown in detail. In particular, a shank 742 is attached to rearward portion 732. Shank 742 has a rounded exterior such that it cooperates with bore 722 in cylinder 720 to provide pivotal engagement between the leg support base 724 and base 715. Shank 742 includes an axial bore 744. Threaded rod 746 extends through the bore 744. Threaded rod 746 includes a bore 748 at a first end and is threaded at the other end. A pin 750 is provided for being press fit in the bore. The pin 750 engages a slot 752 in slotted washer 754 for retaining the washer in non-rotatable engagement with respect to threaded rod 746. A nut 756 engages the threaded portion of rod 746. In operation, nut 756 acts to provide variable pressure of washer 754 against cylinder 720 and nut 756 against shank 742 thereby biasing cylinder 720 against rearward portion 732 of leg support base 724. Preferably, nut 756 is knurled on its outer periphery to allow easy adjustment of the tension by hand. Lock nut 758 is provided to shore-up the tensioning position of nut 756 when a preferred adjustment is reached by the user.

A spring member 760 is provided which is attached to the base 715 such as by riveting or the like at connection 762. Tongue portions 764 and 766 extend rearward toward the bipod legs and downward to meet the upper surface of the side portions 724 and 726 of leg support base 729. This arrangement provides spring tension against pivoting of the leg support base 724 and acts as a centering spring such as that disclosed above in other embodiments of the present invention.

The foregoing description and accompanying drawings illustrate merely exemplary embodiments of the present invention. Various changes, modifications and variations may be made therein without departing from the spirit and scope of the invention as defined in the following claims.

What is claimed is:

1. A pivotal adaptor for pivotally attaching a bipod to a fireman comprising:
    a mounting bracket;
    a means for attachment of a bipod to said mounting bracket;
    a base portion adapted to be attached to a fireman;
    a means for providing pivotal engagement between said mounting bracket and said base portion, said means for providing pivotal engagement including a pair of opposed pivotal pins on opposite sides of said base portion, and said mounting bracket including a pair of flanges with portions thereof defining a bore for engaging said pivotal pins;
    spring means for providing biased engagement between said mounting bracket and said base portion thereby biasing against pivotal movement between said mounting bracket and said base portion for inhibiting unintended pivoting and rattling of said mounting bracket.

2. The pivotal adapter assembly of claim 1 wherein at least one of said pivotal pins further comprises a retractable pin which can be retracted for quick release of said mounting bracket.

3. The pivotal adapter assembly of claim 2 wherein said spring means is a flat spring attached to said base portion, said spring means including at least one prestressed tongue portion of said mounting bracket including at least one flange, operatively associated with said tongue portions for providing biasing against pivotal movement between said mounting bracket and said base portion.

4. The pivotal adapter assembly of claim 2 wherein said spring means is a spring member operably associated with portions of said mounting bracket for providing biasing against pivotal movement between said mounting bracket and said base portion.

5. The pivotal adapter assembly of claim 1 wherein said means for attachment further comprises:
    portions on said base portion for engaging the forestock of a firearm;
    a strap means for providing releasable attachment of said base portion to said firearm, said strap means being connected with said base for encircling said forestock of the firearm and being removable from said firearm;
    means on said strap for tightening said strap to provide secure attachment of said base to said firearm.

6. A mounting assembly for removably attaching a bipod to a firearm, said apparatus comprising:
    a base having a facing means for contoured cradling of a forestock of a firearm;
    strap means for providing releasable attachment of said base to the firearm, said strap means being connected to said base portion for encircling of said firearm;
    means for clampingly engaging the firearm between said strap means and said facing means; and
    means for attachment of a bipod assembly to said base member.

7. The mounting assembly of claim 6 wherein said base portion includes a pair of laterally disposed flanges extending from said facing means, one of said flanges including a strap engaging portion;
    said strap means further comprises a flexible strap member, said flexible strap member being engaged by said strap engagement portion, and wherein said means for clampingly engaging said firearm reduces the area encompassed by said flexible strap member and is between the other end of said strap member and the other flange of said facing means.

8. The mounting assembly of claim 6 wherein said flexible strap member includes a cord like strap, said means for reducing the area of said strap means further comprising a cord retainer member having portions thereon for securely engaging both ends of said cord and a bore therethrough, said strap engaging portion of said flange being for engaging a loop formed in said cord like strap, and further comprising a means for providing relative movement between said cord retainer and the other flange of said facing means.

9. The mounting assembly according to claim 6 wherein said strap member further comprises an outer strap member and an inner saddle member and said means for clampingly engaging the firearm further comprises means for providing relative movement between said inner saddle member and said facing member.

10. The mounting assembly according to claim 9 wherein said means for providing relative movement further comprises a means for providing relative movement between said outer strap member and said inner saddle member.

11. A bipod adapter for use on a semi-automatic firearm, said semi-automatic firearm including a gas block having a threaded bore therein, a fore-end cap adapted for being fastened to said gas block with a fastener, said bipod adapter comprising:
  an adapter base having portions defining a bore therethrough, said base being associated with said firearm generally perpendicular to the longitudinal axis of the barrel when in assembled relationship on said firearm;
  means on said adapter base for substantially engaging portions of the barrel for inhibiting rotational movement of said bipod adapter;
  fastener means for providing axial forces against said base for fastening of said fore-end cap and said base to said gas block; and
  means for attachment of a bipod to said base.

12. The bipod adapter of claim 11 wherein said means for attachment includes a flange portion for extending over a forestock of a rifle and said means for attachment comprises a quick detachable stud having a bore therethrough for attachment of a bipod.

13. A pivotal adapter for pivotally attaching a bipod to a firearm comprising:
  a first base portion;
  means for attaching said first base portion to a firearm;
  a second leg supporting base portion having a pair of bipod legs pivotally attached thereto;
  means for providing pivotal engagement between said first base portion and said second leg supporting base;
  a tensioning means for providing variable frictional resistance at said means for providing pivotal engagement such that the torsional forces necessary for imparting pivotal movement between said first base portion and said second leg supporting base portion is selectively adjustable.

14. The pivotal adapter of claim 13 wherein said leg supporting base further comprises a rearward flange portion and a pair of inclined side portions, said bipod legs being pivotal and biased toward said rearward flange; and
  a means for dampening shock of and for reducing rattling of said bipod legs comprising deformable dampening pads attached to said rearward flange for contacting said bipod legs.

15. The pivotal adapter of claim 13 wherein said means for providing pivotal engagement between said first base portion and said second leg supporting base further comprises a vertically disposed flange portion on said leg supporting base having a cylindrical shank extending therethrough and affixed thereto said shank including a central bore therethrough, a cylindrical block attached to said first base, said cylindrical block including portions forming a bore therethrough for operatively engaging the shank to provide pivotal engagement therebetween a portion of the shank extending through said cylindrical block; and
  said tensioning means further comprises a threaded rod inserted through said bore in said shank, said threaded rod including a first threaded and a second end having a radial bore therethrough, said portion of the shank extending through the cylindrical block including a slot; therein a pin for engaging the bore in said threaded rod and said slot for providing a fixed link therebetween and a nut for providing adjustable engagement of the cylinder between said pin and said vertical flange.

16. A pivotal adaptor for pivotally attaching a bipod to a fireman for providing motion in a plane traverse to the axial direction of the barrel, said pivotal adapter comprising:
  a mounting bracket, said mounting bracket including a pair of flanges, said flanges including portions thereof defining a pair of bores therein which are co-axial with the axial direction of the barrel;
  a base portion adapted to be attached to a fireman; said base portion including a pair of opposed pivotal pins on opposite sides of said base portion which engage said bores of said flanges and are pivotal therein;
  a means for attachment of a bipod to said mounting bracket; and
  spring means for providing biased engagement between said mounting bracket and said portion thereby biasing against pivotal movement between said mounting bracket and said base portion for inhibiting unintended pivoting and rattling of said mounting bracket.

17. A pivotal adapter for pivotally attaching a bipod to a fireman for providing pivotal motion in a plane transverse to the axial direction of the barrel, said pivotal adaptor comprising:
  a mounting bracket;
  a means for attachment of a bipod to said mounting bracket;
  a base portion adapted to be attached to a fireman;
  a means for providing pivotal engagement between said mounting bracket and said base portion, said means for providing pivotal engagement including a pair of pivot pins on either said mounting bracket or said base portion and a pair of flanges on the other of said mounting bracket or said base portion, with portions thereof defining a pair of bores coaxial with the direction of said barrel for pivotal engagement with said pivotal pins; and
  spring means for providing biased engagement between said mounting bracket and said base portion thereby biasing against pivotal movement between said mounting bracket and said base portion for inhibiting unintended pivoting and rattling of said mounting bracket.

* * * * *

UNITED STATES PATENT AND TRADEMARK OFFICE
CERTIFICATE OF CORRECTION

PATENT NO. : 4,903,425                            Page 1 of 2

DATED : February 27, 1990

INVENTOR(S) : Gerald Harris

It is certified that error appears in the above-identified patent and that said Letters Patent is hereby corrected as shown below:

Column 2, line 44, "a" should be --an--. (first occurrence)

Column 4, line 49, after "with" insert --a--.

Column 5, line 51, after "rifle" delete --124--.

Column 6, line 15, "23" should be --236--.

Column 6, line 23, after "10" insert --and--.

Column 7, line 26, after "cord" insert --519--.

Column 7, line 26, after "like" delete --519--.

Column 7, line 33, "Through bores" should be --Through-bores--.

Column 8, line 21, "6I4" should be --614--.

Column 8, line 22, "6!0" should be --610--.

UNITED STATES PATENT AND TRADEMARK OFFICE
CERTIFICATE OF CORRECTION

PATENT NO. : 4,903,425

DATED : February 27, 1990

INVENTOR(S) : Gerald Harris

It is certified that error appears in the above-identified patent and that said Letters Patent is hereby corrected as shown below:

Column 8, line 27, "ma" should be --may--.

Column 12, line 26, after "providing" insert --pivotal--.

Column 12, line 41, after "said" insert --base--.

Signed and Sealed this

Twenty-seventh Day of August, 1991

Attest:

HARRY F. MANBECK, JR.

*Attesting Officer*    *Commissioner of Patents and Trademarks*